(12) United States Patent
Gu et al.

(10) Patent No.: US 11,130,117 B2
(45) Date of Patent: Sep. 28, 2021

(54) CATALYTIC ARTICLE COMPRISING COMBINED PGM AND OSC

(71) Applicant: BASF Corporation, Florham Park, NJ (US)

(72) Inventors: Yunlong Gu, Edison, NJ (US); Michel Deeba, East Brunswick, NJ (US); Tian Luo, Piscataway, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/307,956

(22) PCT Filed: May 4, 2017

(86) PCT No.: PCT/US2017/031048
§ 371 (c)(1),
(2) Date: Dec. 7, 2018

(87) PCT Pub. No.: WO2017/218092
PCT Pub. Date: Dec. 21, 2017

(65) Prior Publication Data
US 2019/0299192 A1    Oct. 3, 2019

Related U.S. Application Data

(60) Provisional application No. 62/349,284, filed on Jun. 13, 2016.

(51) Int. Cl.
*B01J 21/04*    (2006.01)
*B01J 21/06*    (2006.01)
(Continued)

(52) U.S. Cl.
CPC ............ *B01J 23/63* (2013.01); *B01D 53/945* (2013.01); *B01J 21/04* (2013.01); *B01J 35/006* (2013.01);
(Continued)

(58) Field of Classification Search
CPC . B01J 21/04; B01J 23/63; B01J 35/006; B01J 35/04; B01J 21/066; B01J 23/10;
(Continued)

(56) References Cited

U.S. PATENT DOCUMENTS 6,797,668 B2 *  9/2004  Yoshikawa ............ B01J 23/002
                                                502/304
6,893,998 B2 *  5/2005  Shigapov ................ B01J 23/63
                                                502/327
(Continued)

FOREIGN PATENT DOCUMENTS

EP    1632288 A1    3/2006
EP    2039425 A1    3/2009

OTHER PUBLICATIONS

International Search Report dated Aug. 10, 2017.
(Continued)

*Primary Examiner* — Cam N. Nguyen
(74) *Attorney, Agent, or Firm* — Baltazar Gomez

(57) ABSTRACT

The present disclosure provides catalytic materials and catalytic articles formed therewith. The catalytic materials particularly can include an oxygen storage component comprising a solid solution of at least one platinum group metal and at least one rare earth metal oxide. In one or more embodiments, catalytic materials can include a solid solution of a platinum group metal (e.g., palladium) and a mixed metal oxide (e.g., ceria/zirconia).

11 Claims, 3 Drawing Sheets

(51) Int. Cl.
| | |
|---|---|
| B01J 23/10 | (2006.01) |
| B01J 23/40 | (2006.01) |
| B01J 23/42 | (2006.01) |
| B01J 23/44 | (2006.01) |
| B01J 23/46 | (2006.01) |
| B01J 23/63 | (2006.01) |
| B01J 23/89 | (2006.01) |
| B01J 35/00 | (2006.01) |
| B01J 35/04 | (2006.01) |
| B01J 37/00 | (2006.01) |
| B01J 37/02 | (2006.01) |
| B01J 37/03 | (2006.01) |
| B01J 37/06 | (2006.01) |
| B01J 37/08 | (2006.01) |
| F01N 3/10 | (2006.01) |
| F01N 3/28 | (2006.01) |
| B01D 53/94 | (2006.01) |

(52) U.S. Cl.
CPC ............. B01J 35/04 (2013.01); B01J 37/009 (2013.01); B01J 37/0201 (2013.01); B01J 37/0215 (2013.01); B01J 37/03 (2013.01); B01J 37/035 (2013.01); B01J 37/038 (2013.01); B01J 37/06 (2013.01); B01J 37/08 (2013.01); F01N 3/101 (2013.01); F01N 3/108 (2013.01); F01N 3/2803 (2013.01); B01D 53/944 (2013.01); B01D 2255/1023 (2013.01); B01D 2255/2061 (2013.01); B01D 2255/2063 (2013.01); B01D 2255/2065 (2013.01); B01D 2255/20715 (2013.01); B01D 2255/908 (2013.01); B01J 2523/00 (2013.01)

(58) Field of Classification Search
CPC ... B01J 23/40; B01J 23/42; B01J 23/44; B01J 23/46; B01J 23/894; B01J 37/009; B01J 37/0201; B01J 37/0215; B01J 37/03; B01J 37/035; B01J 37/038; B01J 37/06; B01J 37/08; F01N 3/101; F01N 3/108; F01N 3/2803
USPC ........ 502/302–304, 332–334, 339, 349, 355, 502/415, 439
See application file for complete search history.

(56) References Cited

U.S. PATENT DOCUMENTS

| | | | | | |
|---|---|---|---|---|---|
| 7,229,948 | B2* | 6/2007 | Chigapov | ............ | B01J 37/0215 502/327 |
| 7,576,029 | B2* | 8/2009 | Saito | ........................ | B01J 23/63 502/302 |
| 7,875,250 | B2* | 1/2011 | Nunan | ..................... | B01J 23/40 422/177 |
| 8,207,078 | B2* | 6/2012 | Lu | ........................ | B01J 37/0215 502/60 |
| 8,211,824 | B2* | 7/2012 | Akamine | ............ | B01D 53/945 502/302 |
| 8,697,600 | B2* | 4/2014 | Nobukawa | ........... | B01D 53/945 502/302 |
| 9,012,353 | B2* | 4/2015 | Golden | ................ | B01D 53/945 502/339 |
| 9,409,152 | B2* | 8/2016 | Kumatani | ............ | B01J 35/1038 |
| 9,597,666 | B2* | 3/2017 | Wu | ........................ | B01J 35/023 |
| 9,687,811 | B2* | 6/2017 | Biberger | .................. | B01J 20/02 |
| 9,718,053 | B2* | 8/2017 | Kadota | ..................... | B01J 35/04 |
| 9,795,945 | B2* | 10/2017 | Shirakawa | ............ | B01J 35/006 |
| 9,937,487 | B2* | 4/2018 | Miura | .................. | B01J 35/0006 |
| 10,086,356 | B2* | 10/2018 | Biberger | .................. | B01J 20/02 |
| 2004/0092395 | A1* | 5/2004 | Hase | .................... | B01D 53/945 502/439 |
| 2006/0270549 | A1* | 11/2006 | Sato | ..................... | B01J 37/0248 502/302 |
| 2007/0197373 | A1* | 8/2007 | Miura | .................. | B01D 53/945 502/100 |
| 2009/0082199 | A1* | 3/2009 | Suzuki | ................ | B01J 23/8913 502/326 |
| 2009/0099011 | A1* | 4/2009 | Miura | ...................... | B01J 23/63 502/303 |
| 2009/0209416 | A1* | 8/2009 | Sato | ........................ | B01J 35/023 502/304 |
| 2010/0077727 | A1* | 4/2010 | Southward | ........... | B01D 53/944 60/274 |
| 2011/0020201 | A1 | 1/2011 | Luo et al. | | |
| 2012/0028795 | A1* | 2/2012 | Chan | .................... | B01J 35/0013 502/304 |
| 2013/0274096 | A1 | 10/2013 | Wu et al. | | |
| 2014/0357480 | A1* | 12/2014 | Aoki | ........................ | B01J 23/44 502/304 |
| 2015/0196902 | A1 | 7/2015 | Golden et al. | | |
| 2015/0266004 | A1* | 9/2015 | Kumatani | ............ | B01J 35/1042 502/304 |
| 2016/0038927 | A1* | 2/2016 | Kadota | ................ | B01J 37/0018 502/304 |
| 2019/0009244 | A1* | 1/2019 | Biberger | ............. | B01J 20/0207 |

OTHER PUBLICATIONS

Written Opinion dated Aug. 10, 2017.
Priolkar, K. R. et al., "Format ion of Ce1-xPdxO2- δ solid solution in combustion-synthesized Pd/CeO2 catalyst: XRD, XPS, and EXAFS investigation," Chemistry of Materials, 2002, vol. 14, No. 5, pp. 2120-2128.
Yang, Xue et al., "Investigation on properties of Pd/CeO2—ZrO2—Pr2O3 catalysts with different Ce/Zr molar ratios and its application for automotive emission control," Journal of Hazardous Materials, 2015, vol. 285, pp. 182-189.
European Search Report for EP Patent Application No. 17813736.0, dated Jan. 23, 2020, 3 pages.

* cited by examiner

United States Patent US 11,130,117 B2

CATALYTIC ARTICLE COMPRISING COMBINED PGM AND OSC

CROSS-REFERENCE TO RELATED APPLICATIONS

This application is a national stage of PCT/US2017/031048, filed May 4, 2017 which claims the benefit of U.S. Provisional Application No. 62/349,284 filed Jun. 13, 2016, the contents of which are hereby incorporated by reference in their entirety.

FIELD OF THE DISCLOSURE

The present disclosure relates to catalytic materials and catalytic articles prepared therefrom. In particular, the present disclosure relates to solid solutions of at least one platinum group metal and at least one rare earth metal oxide and to catalytic articles formed therewith.

BACKGROUND

Three-way conversion (TWC) catalysts are used in engine exhaust streams to catalyze the oxidation of the unburned hydrocarbons (HCs) carbon monoxide (CO) in the exhaust streams and also to catalyze the reduction of nitrogen oxides (NOx) to nitrogen. The presence of an oxygen storage component (OSC) in a TWC catalyst allows oxygen to be stored during lean conditions to promote reduction of NOx adsorbed on the catalyst, and to be released during rich conditions to promote oxidation of HCs and CO adsorbed on the catalyst. TWC catalysts typically comprise one or more platinum group metals (e.g., platinum, palladium, rhodium, and/or iridium) located upon a support such as a high surface area, refractory oxide support, e.g., a high surface area alumina, or a composite support such as a ceria-zirconia composite. The support is carried on a suitable carrier or substrate such as a monolithic carrier comprising a refractory ceramic or metal honeycomb structure, or refractory particles such as spheres or short, extruded segments of a suitable refractory material.

The high conversion efficiency of a TWC can only be achieved within a very narrow "operation window" of air to fuel ratio. In practice, the air to fuel ratio must fluctuate around the theoretic value to some extent (typically 1±0.05) due to the change of the operation modes of engine. As a result, the TWC cannot eliminate all three kinds of pollutants (HCs, CO, and NOx) at the same time. It is, therefore, very essential and vital for an excellent TWC to have a large operation window even after repeated exposure to the actual auto-exhaust environment. The addition of an oxygen storage agent into a TWC is to enlarge the operation window and hence to achieve an optimal working efficiency under learn-burn and rich-burn conditions.

Because the substantial cost of OSCs, it is desirable to provide further materials that may provide efficacy in TWCs. As such, there is a continuing need in the art for catalytic materials that are thermally stable and whose ingredients are used efficiently.

SUMMARY OF THE DISCLOSURE

The present disclosure provides catalytic materials and catalytic articles. In one or more embodiments, the present disclosure particularly relates to materials useful as an oxygen storage component, such as in a three-way catalyst. The present materials can exhibit improved properties in light of the improved interaction between a platinum group metal (PGM) and a rare earth metal that are provided in a solid solution. For example, the materials can be co-precipitated to form the solid solution. The PGM may be combined with a single metal or may be in a solid solution with a mixed metal oxide (e.g., oxides of at least two metals, such as cerium oxide and zirconium oxide).

In some embodiments, the present disclosure particularly can relate to a composite material comprising at least one PGM and at least one rare earth metal oxide in the form of a solid solution. In further embodiments, the composite material may be defined in relation to one or more of the following statements, which can be combined in any number and order.

The PGM can be palladium, can be a different PGM, or can be a mixture of Pd and one or more further PGM.

The rare earth metal oxide can be ceria, can be a different rare earth metal oxide, or can be a mixture of ceria and one or more further rare earth metal oxides.

The composite material can further comprise an oxide of a different (e.g., other than a rare earth metal), such as zirconia.

The composite material can further comprise one or more oxides of Lanthanum, Yttrium, Neodymium, Gadolinium, or Praseodymium.

The composite material can further comprise one or more oxides of Niobium, Iron, Nickel, Silver, Cobalt, Manganese, Copper, and Tungsten.

The composite material can further comprise a support material supporting the solid solution.

A support material used with the solid solution can be an alumina.

A support material used with the solid solution can be an OSC (e.g., ceria/zirconia, or similar materials).

The solid solution of the at least one PGM and the at least one rare earth metal can be impregnated on a support material.

The solid solution can be a co-precipitate of the at least one PGM and the at least one rare earth metal oxide.

The composite material can include at least one further PGM that is not part of the solid solution (i.e., that is added to the composite material separate from the solid solution).

The composite material can include at least one further rare earth metal oxide that is not part of the solid solution (i.e., that is added to the composite material separate from the solid solution).

In one or more embodiments, the present disclosure can relate specifically to catalytic articles that incorporate a composite material as described. For example, the present disclosure can provide a three-way catalyst composition comprising an oxygen storage component including the composite material according to any one embodiment of combination of embodiments described herein. The catalytic article can be independent of a carrier; however, in some embodiments, the catalytic article may comprise a carrier (e.g., a honeycomb monolith) on which a composite material as described herein is included as a washcoat.

In some embodiments, the present disclosure further can relate to a method of preparing a composite oxygen storage component. For example, such method can comprise combining a compound of a PGM with a compound of a rare earth metal to form a liquid solution, and co-precipitating the PGM and the rare earth metal from the liquid solution to form a solid solution of the PGM and the rare earth metal. In further embodiments, the method may be defined by one or more of the following statements, which may be combined in any number and order.

The PGM and the rare earth metal can be co-precipitated on a surface of a support material (e.g., an alumina support or a support formed of an OSC—e.g., ceriaizirconia).

The solid solution of the PGM and the rare earth metal can be impregnated on a support material (e.g., an alumina support or a support formed of an OSC—e.g., ceriaizirconia).

The co-precipitating can comprise adding an alkalinizing material in an amount sufficient to raise the pH of the liquid solution, such to a pH of about 8 or greater.

The method can comprise washing and filtering the solid solution of the PGM and the rare earth metal to form a filter cake.

The method can comprise calcining the filter cake at a temperature of about 300° C. or greater for a time of about 10 minutes or greater. After calcining, the solid solution can comprise the PGM and an oxide of the rare earth metal. For example, after calcining, the solid solution can comprise palladium and cerium oxide.

Formation of the composite oxygen storage component can include carrying out the co-precipitating with the addition of a non-rare earth metal. For example, a zirconium compound can be utilized, and the composite OSC after calcining can include the PGM, the rare earth metal oxide, and the oxide of the non-rare earth metal.

DETAILED DESCRIPTION OF THE DISCLOSURE

Figure 1:
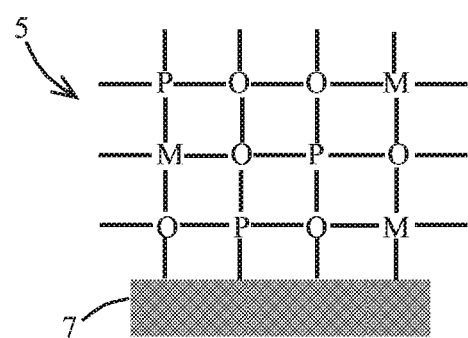
FIG. 1 is an illustration of a solid solution of a platinum group metal and a rare earth metal oxide on a support according to one or more embodiments of the present disclosure.

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to catalytic materials and catalytic articles formed from such catalytic articles. In particular, the present disclosure provides oxygen storage components (OSCs) exhibiting improved properties. In one or more embodiments, the present disclosure provides composite materials that are effective as OSCs and that may be combined with a substrate, which may also be an OSC. The composite materials provide a combination of at least one platinum group metal (PGM) and at least one rare earth metal oxide wherein the PGM and the rare earth metal oxide may exhibit synergism that improves the overall function of the OSC. In particular, the PGM and the rare earth metal oxide can be in the form of a solid solution. While not wishing to be bound by theory, it is believed that by providing the PGM and the rare earth metal oxide in a solid solution, the PGM atoms and the rare earth metal atoms can be maintained in a closer configuration that allows each component to function more effectively. Likewise, a greater percentage of the rare earth metal can be positioned closer to the surface of the composite material as compared to other OSC materials where a PGM may be impregnated on the surface of a pre-formed OSC, such as a ceria/zirconia material.

In one or more embodiments, the present disclosure provides a composite material comprising at least one PGM and at least one rare earth metal oxide, the PGM and the rare earth metal oxide being in the form of a solid solution. As used herein, the term "solid solution" is understood to refer to a homogeneous mixture of one or more solutes in a solvent, wherein the homogeneous mixture is in a solid state, and the crystal structure of the solvent is substantially unchanged by the presence of the one or more solutes. In some embodiments, a PGM may be a solute and a rare earth metal oxide may be a solvent for the solid solution. A solid solution may be independent (e.g., in the form of particles formed substantially completely from the solid solution) or may be supported on a support material. In some embodiments, the solid solution can be defined as being a co-precipitate of the PGM and the rare earth metal.

A PGM may refer to any of ruthenium, rhodium, palladium, osmium, iridium, and platinum. In preferred embodiments, palladium specifically may be used as the PGM. A solid solution as described herein can, in some embodiments, expressly exclude the presence of any one or more PGM. For example, a solid solution of palladium and at least one rare earth metal oxide may be substantially free or completely free of any one or any combination of ruthenium, rhodium, osmium, iridium, and platinum. Substantially free means that the solid solution comprises less than 0.01% by weight of the excluded metal. A solid solution of a PGM and a rare earth metal oxide preferably comprises about 0.05 wt % to about 5 wt %, about 0.1 wt % to about 3 wt %, or about 0.2 wt % to about 2 wt % of PGM based on the total weight of the solid solution.

A rare earth metal can refer to any of the metals commonly recognized to be in the rare earth element class; however, in preferred embodiments, a rare earth metal oxide can be an oxide of any of yttrium, lanthanum, cerium, praseodymium, neodymium, samarium, gadolinium, and terbium. In preferred embodiments, cerium, lanthanum, and/or yttrium can be used in the rare earth metal oxide—e.g., as ceria ($CeO_2$), lanthana ($La_2O_3$), and yttria ($Y_2O_3$). A solid solution of a POM and a rare earth metal oxide preferably comprises about 10 wt % to about 99.9 wt %, about 20 wt % to about 99.8 wt %, or about 60 wt % to about 99.7 wt % of rare earth metal oxide based on the total weight of the solid solution.

In some embodiments, the solid solution can include one or more further materials in addition to the PGM and the rare earth metal oxide. For example, one or more further metal oxides may be included. In some embodiments, zirconia ($ZrO_2$) may be included in an amount of up to 75 wt %, up to 60 wt %, or up to 50 wt % based on the total weight of the solid solution.

In one or more embodiments, a composite material as described herein may include one or more PGM and/or one or more rare earth metal and/or one or more further metal that is not part of the solid solution. For example, a PGM may be added to the composite after formation of the solid solution. As another example, the solid solution may be combined with a separate OSC. Reference to an OSC can refer to an entity that has multi-valence states and can actively react with oxidants such as oxygen or nitrous oxides under oxidative conditions, or can react with reductants such as carbon monoxide (CO) or hydrogen under reduction conditions. In some embodiments, suitable OSCs may be in the form of a mixed oxide. Non-limiting examples of suitable mixed oxides include: mixed oxides of cerium and zirconium; mixed oxides of cerium, zirconium, and neodymium; mixed oxides of cerium, zirconium, and lanthanum; mixed oxides of cerium, zirconium, lanthanum, and neodymium; mixed oxides of cerium, zirconium, lanthanum, neodymium, and yttrium; mixed oxides of praseodymium and zirconium; mixed oxides of lanthanum and zirconium; mixed oxides of yttrium and zirconium; mixed oxides of cerium, zirconium, and one or more further rare earth metals; mixed oxides of praseodymium, zirconium, and one or more further rare earth metals; mixed oxides of lanthanum, zirconium, and one or more rare earth metals; and mixed oxides of yttrium, zirconium, and one or more rare earth metals; and mixed oxides of praseodymium, zirconium, and one or more rare earth metals.

If desired, the composite material can include a support material that at least partially supports the solid solution. For example, FIG. 1 shows a solid solution 5 supported by support member 7. The solid solution 5 comprises a solvent formed of metal oxide atoms (M and O) with interspersed PGM atoms (P). In some embodiments, a suitable support material can be an alumina. One specific, suitable example is gamma alumina. In some embodiments, a suitable support material can be an OSC. For example, a mixed metal oxide as defined above may be used as an OSC support material. The solid solution can be combined with the support material during formation of the solid solution or after formation of the solid solution. In one or more embodiments, the solid solution can be impregnated on the support material or the solid solution can be co-precipitated on the support material.

Composite materials that can be particularly useful as OSCs can be prepared by methods wherein the PGM and the rare earth metal are co-precipitated. In one or more embodiments, a composite material may be prepared by combining a compound of a platinum group metal with a compound of a rare earth metal to form a liquid solution. Thereafter, the platinum group metal and the rare earth metal can be co-precipitated from the liquid solution to form a solid solution of the platinum group metal and the rare earth metal.

To form the co-precipitate, precursor compounds for the PGM and the rare earth metal are dissolved to form an aqueous solution. Dissolution can be carried out with heating and/or with stirring. Heating may be from above room temperature up to a temperature of about 80° C., about 70° C., or about 60° C. In some embodiments, heating can be in the range of about 40° C. to about 80° C.

In some embodiments, all of the metal species to be included in the composite material may be provided in the same aqueous solution. This can include all PGM species, all rare earth metal species, and any further metal species desired for inclusion in the solid solution to be formed.

Non-limiting examples of metal precursor compounds that can be used in forming a co-precipitate as described herein can nitrate salts of the PGM(s), nitrate salts of the rare earth metal(s), and nitrate salts of further metals (e.g., zirconium) that are desired. Once the metal compounds are in solution, precipitation can be carried out with addition of a precipitating agent. In one or more embodiments, the precipitating agent can be a pH-adjusting agent, preferably an alkalinizing agent. In some embodiments, the initial metal compound solution can be substantially acidic, such as having a pH that is about 6 or less, about 5 or less, or about 4 or less. The precipitating agent, for example, can be configured to raise solution pH to about 7 or greater, about 7.5 or greater, about 8 or greater, or about 8.5 or greater. The precipitating agent preferably can be configured to provide a solution pH of about 7 to about 12. Non-limiting examples of precipitating agents that may be used include ammonia species and hydroxides. In some embodiments, sodium hydroxide may be used. Addition of the precipitating agent is effective to co-precipitate the metal species from the solution.

The co-precipitate can be filtered and washed to remove soluble by-products. Beneficially, the co-precipitate is sufficiently stable so that washing causes little to no loss of the metal precipitates. Washing can be carried out with, for example, DI water. Washing can be performed with various methods, such as using a Büchner funnel, filter press, or the like.

The resulting filter cake can be dried to provide the co-precipitate in the form of a granular solid. For example, in some embodiments, the co-precipitate can be dried in a calcining tray at a temperature of about 80° C. to about 200° C., about 85° C. to about 180° C., or about 90° C. to about 160° C. for a time of about 1 hour to about 48 hours, about 2 hours to about 36 hours, or about 3 hours to about 24 hours. The dried filter cake can be ground into a powder form.

In one or more embodiments, the dried filter cake can be calcined. Although the non-calcined filter cake can be useful as a catalytic material, calcining can impart specifically useful properties to the co-precipitate in relation to the form of the resulting material. The dried filter cake can be calcined at a temperature of about 300° C. or greater—e.g., about 300° C. to about 700° C., about 350° C. to about 650° C., or about 400° C. to about 600° C., for a time of about 10 minutes to about 12 hours, about 30 minutes to about 8 hours, or about 1 hour to about 6 hours.

Preferably, drying and/or calcining is effective to convert substantially all of the rare earth metal compounds in the co-precipitate to the oxide form. Substantially all of the rare earth metal being in the oxide form can mean that at least 99% by weight, at least 99.5% by weight, or at least 99/9% by weight of the rare earth metal compounds in the co-precipitate are in an oxide form.

In some embodiments, the PGM and the rare earth metal can be co-precipitated on a surface of a support material. For example, a support material may be added to the initial solution of the PGM precursor compound(s) and the rare earth metal compound(s) before addition of the precipitating agent (e.g., the pH-adjusting agent). As noted above, the support may be any suitable material for use in a catalytic article, such as an alumina or an OSC material. In particular, gamma-alumina and/or a ceria/zirconia OSC may be used. In further embodiments, the PGM and the rare earth metal may be provided in the form of the solid solution, which solid solution can be added to a support material, such as via impregnation.

The presently described composite materials can be utilized in a number of catalytic materials and catalytic articles.

For example, an OSC may comprise a composite material as described herein. Moreover, such OSC may be utilized in a TWC, a diesel oxidation catalyst (DOC), or other automotive catalyst.

In one or more embodiments, a catalytic article according to the present disclosure can comprise a substrate and a coating on one or more surfaces of the substrate. In such embodiments, a catalytic material including a composite as described herein can be present at least in the coating. In particular, the coating on the substrate can comprise an OSC that includes the composite material. In some embodiments, the catalytic material can be used in a washcoat. As used herein, the term "washcoat" has its usual meaning in the art of a thin, adherent coating of a catalytic or other material applied to a carrier substrate material. As is understood in the art, a washcoat is obtained from a dispersion of particles in a slurry, which is applied to a substrate, dried and calcined to provide the porous washcoat. As used herein, the term "substrate" refers to the monolithic material onto which the catalyst is placed, typically in the form of a washcoat, such as a honeycomb-type carrier member, which is sufficiently porous to permit the passage of the gas stream being treated.

A washcoat typically is formed by preparing a slurry containing a certain solids content (e.g., 30-90% by weight) of catalyst material in a liquid vehicle, which is then coated onto a substrate and dried to provide a washcoat layer. A coating composition according to the present disclosure can include substantially only the composite material and a suspending agent, particularly, water. In some embodiments, the coating composition can include further metal oxides and, optionally, further support materials (e.g., zeolites, aluminas, OSCs, etc.). In some embodiments, one or more binder materials may be used. Added binders, when present, can be selected from any binder known to those in the art. In one or more embodiments, the additional binder can be titania, alumina, zirconia, or silica binder. For example, without limitation, the binder can be selected from titanium oxychloride ($TiOCl_2$), titanium oxysulfate ($TiOSO_4$), aluminum trihydrate ($Al(OH)_3$), boehmite ($AlO(OH)$), aluminum nitrate $Al(NO_3)_3$, SiO, sols (e.g. commercially available Nalco® 1034A), and zirconia compounds. In some embodiments, however, the coating composition can be expressly free of any binder.

According to one or more embodiments, the substrate for the catalyst composition may be constructed of any material typically used for preparing automotive catalysts and will typically comprise a metal or ceramic honeycomb structure. The substrate typically provides a plurality of wall surfaces upon which the catalyst composition is applied and adhered, thereby acting as a carrier for the catalyst composition. For example, the substrate can be selected from one or more of a flow-through honeycomb monolith, a wall-flow filter, a foam, or a mesh. The catalyst material can be applied to the substrate as a washcoat in particular, or in any other suitable form and/or coating process. Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the present disclosure is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0,002 and 0.1 inches. A representative commercially available wall-flow substrate is constructed from a porous cordierite, an example of which has 200 cpsi and 10 mil wall thickness, or 300 cpsi with 8 mil wall thickness, and wall porosity between 45-65%. Other ceramic materials such as aluminum-titanate, silicon carbide and silicon nitride are also used a wall-flow filter substrates. However, it will be understood that the present disclosure is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 2:
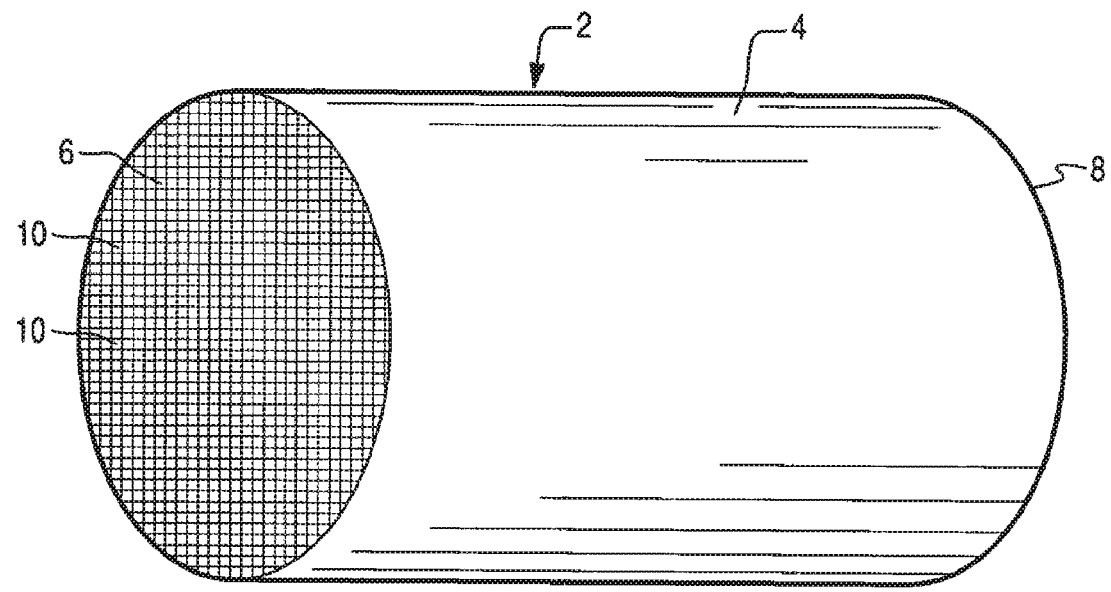
FIG. 2 is an illustration of an exemplary substrate in the form of a honeycomb monolith coated with a catalyst composition according to one or more embodiments of the present disclosure.

FIG. 2 illustrates an exemplary substrate 2 in the form of a honeycomb monolith coated with a catalyst composition as described herein. The exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. In the case of a flow-through monolith, the passages 10 are typically unobstructed so as to permit the flow of a fluid, e.g., a gas stream, longitudinally through carrier 2 via gas flow passages 10 thereof. Alternatively, the substrate 2 can be in the form of a wall-flow filter as discussed in detail above. In such an embodiment, each gas flow passage 10 is blocked at either the inlet or outlet end and the walls of the passages are porous to allow gas to travel from one gas flow passage into an adjacent gas flow passage, as would be understood in the art. If desired, the catalyst composition can be applied in multiple, distinct layers. The present disclosure can be practiced with one or more (e.g., 2, 3, or 4) washcoat layers.

To coat the substrates with the catalyst of one or more embodiments, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the substrate first by allowing it to drain from the channels, then by blowing with compressed air (against the direction of slurry penetration), and then by pulling a vacuum from the direction of slurry penetration. By using this technique, in the case of a wall-flow substrate, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate and, thus, at least partially occlude the pores in the wall.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Embodiments of the present disclosure are further illustrated by the following examples, which are set forth to illustrate the presently disclosed subject matter and are not to be construed as limiting.

Example 1—Preparation of OSC Materials

A comparative material (Comparative OSC-1) was prepared as follows. Cerium nitrate (69 g), zirconium nitrate (127 g), lanthanum nitrate (9.37 g), and yttrium nitrate (8.48 g) were dissolved in 300 ml of water. Sodium hydroxide was added to the combined solution to raise pH to approximately 9 and co-precipitate all components together. The co-precipitate was filtered and washed with deionized water to provide a filter cake, which was dried at 110° C. and calcined at 550° C. for two hours. The calcined material was then impregnated with a palladium nitrate solution. The resulting Comparative OSC-1 had the following composition: 46.1 wt % $ZrO_2$, 35.5 wt % $CeO_2$, 4.9 wt % $La_2O_3$, 4.6 wt % $Y_2O_3$, and 0.5 wt % Pd.

A composite OSC according to the present disclosure (Inventive OSC-2) was prepared as follows. Cerium nitrate (69 g), zirconium nitrate (127 g), lanthanum nitrate (9.37 g), and yttrium nitrate (8.48 g) were dissolved in 300 ml of water and combined with a palladium nitrate solution (25.9 wt % Pd). Sodium hydroxide was added to the combined solution to raise pH to approximately 9 and co-precipitate all components together. The co-precipitate was filtered and washed with deionized water to provide a filter cake, which was dried at 110° C. and calcined at 550° C. for two hours. The resulting Inventive OSC-2 had the following composition: 48.9 wt % $ZrO_2$, 37.1 wt % $CeO_2$, 5.32 wt % $La_2O_3$, 4.7 wt % $Y_2O_3$, and 0.5 wt % Pd.

Comparative OSC-1 and inventive OSC-2 were aged in 10% steam and 90% air at 1050° C. for 12 hours. The aged materials were then subjected to testing.

Example 2—TPR Testing of OSC Materials

Figure 3:
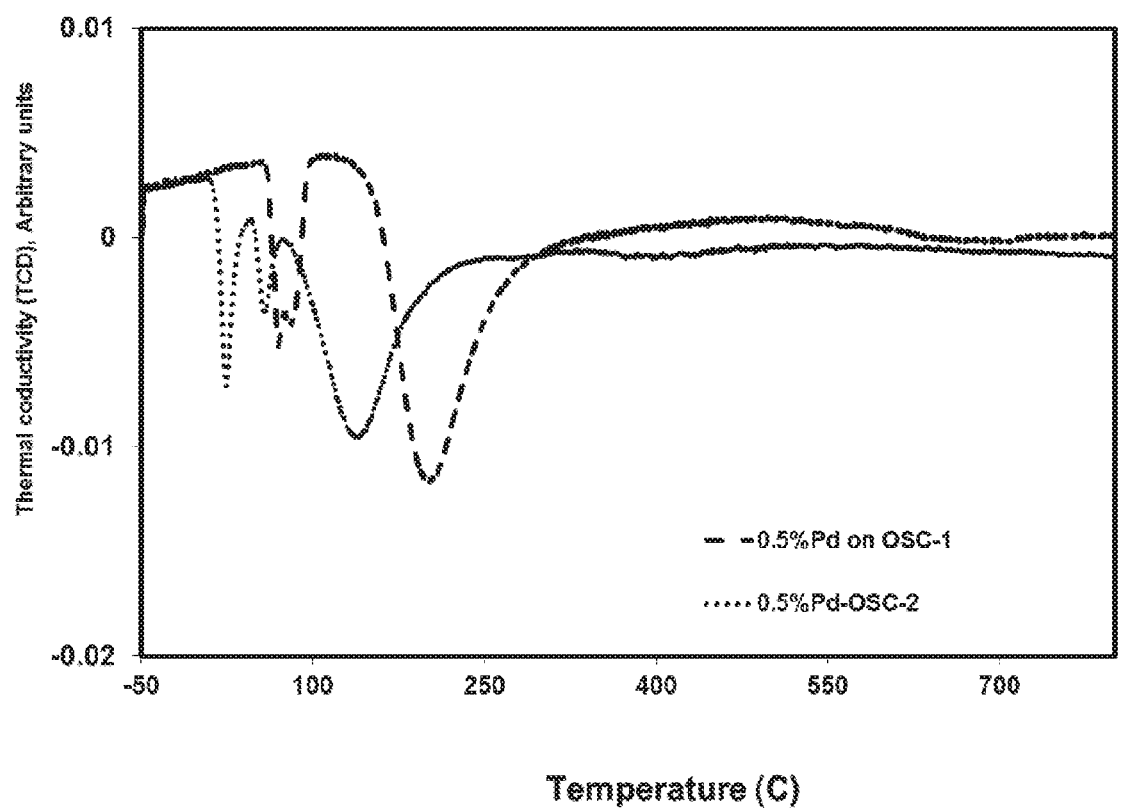
FIG. 3 is graph showing a Thermal Program Reduction (TPR) trace for a comparative OSC material and an inventive OSC material according to an exemplary embodiment of the present disclosure.

The aged Comparative OSC-1 and inventive OSC-2 materials were subjected to the Thermal Program Reduction test. To carry out the test, the catalysts were first completely oxidized. Thereafter, 50 mg of catalyst was introduced into a TPR cell where a flow of 1% hydrogen by weight in nitrogen was passed over the catalyst. Temperature was then ramped from room temperature up to 900° C. at a rate of 20° C./min. Results are shown in FIG. 3. The consumption of $H_2$ in TPR was measured using a Thermal Conductivity Detector and measured as arbitrary units (a.u.). The area under the peaks is converted to hydrogen consumption given as ml or cc of $H_2$ per gram of catalyst. The distribution of $H_2$ Consumption as a function of temperature is shown in TABLE 1. Total $H_2$ consumption was 4.913 $cm^3/g$ for Comparative OSC-1 and was 6.303 $cm^3/g$ for Inventive OSC-2. Inventive OSC-2 was advantageous in light of its lower reduction temperature. Specifically, Inventive OSC-2 had a reduction temperature that was about 50° C. lower than with Comparative OSC1. This is due to the proximity of Pd to $CeO_2$ in Inventive OSC-2. This lower temperature can translate into being a significantly more effective OSC material in light of the improved "Oxygen Mobility". Faster oxygen transfer in OSC materials can lead to higher NOx reduction during driving transients.

TABLE 1

| Sample | Peak No. | Temp. at Maximum (° C.) | Quantity ($cm^3/g$) | Peak Concentration (%) |
|---|---|---|---|---|
| Comparative OSC-1 | 1 | 23.7 | 0.33762 | 0.92 |
| | 2 | 57.3 | 0.15284 | 0.97 |
| | 3 | 136.6 | 1.65379 | 0.92 |
| | 4 | 143.6 | 2.76881 | 0.98 |
| Inventive OSC-2 | 1 | 68.9 | 0.27772 | 0.96 |
| | 2 | 82.2 | 0.53066 | 0.94 |
| | 3 | 196.7 | 5.49471 | 0.86 |

Example 3—XPS Testing of OSC Materials

The aged Comparative OSC-1 and Inventive OSC-2 materials were subjected to x-ray photoelectron spectroscopy (XPS) testing to evaluate the surface chemistry of the two materials. The XPS data summary is provided in TABLE 2 (with values being shown in weight percent relative to the total weight of the OSC). As seen therein, although the two materials each comprised 0.5 wt % Pd, the Inventive OSC-2 material exhibited a significantly higher Pd surface concentration ([$Pd^{+2}$]+[$Pe^{+4}$]), the Comparative OSC-1 material having a Pd surface concentration of 0.38, and the Inventive OSC-2 material having a Pd surface concentration of 0.78. Further, the Ce surface concentration in the Comparative OSC-1 material was only 4.1 compared to the Ce surface concentration in the Inventive OSC-2 sample of 7.1. The higher surface concentration of Pd and Ce in the Inventive OSC-2 sample is believed to improve oxygen mobility as compared to the Comparative OSC-1 sample.

TABLE 2

| Element | Comparative OSC-1 | Inventive OSC-2 |
|---|---|---|
| Cerium ($Ce^{+4}$) | 7.1 | 4.1 |
| Lanthanum ($La_2O_3$) | 2.2 | 1.0 |
| Palladium ($Pd^{+2}$) | 0.44 | 0.25 |
| Palladium ($Pd^{+4}$) | 0.34 | 0.13 |
| Yttrium ($Y_2O_3$) | 1.9 | 1.3 |
| Zirconium ($ZrO_2$) | 14.3 | 12.4 |

Example 4—Preparation of OSC Materials

A comparative material (Comparative OSC-3) was prepared was prepared by impregnating palladium on a commercial OSC material with the following composition: 40 wt % $CeO_2$, 50 wt % $ZrO_2$, 5 wt % $La_2O_3$, and 5 wt % $Y_2O_3$. Specifically, using a solution of palladium nitrate (27 with % Pd) in an incipient wetness impregnation process, sufficient solution was added to the commercial OSC such that, after calcination at 550° C. for 2 hours, the material (Comparative OSC-3) had a Pd concentration of 0.5 wt %. The Comparative OSC-3 material was then aged in 10% steam and 90% air at 1050° C. for 12 hours.

A comparative material (Comparative OSC-4) was prepared was prepared by impregnating palladium on a commercial OSC material with the following composition: 64 wt % $CeO_2$, 21 wt % $ZrO_2$), 2 wt % $La_2O_3$, 5.2 wt % $Nd_2O_3$, and 8 wt % $Y_2O_3$. Specifically, using a solution of palladium nitrate (27 wt % Pd) in an incipient wetness impregnation process, sufficient solution was added to the commercial OSC such that, after calcination at 550° C. for 2 hours, the material (Comparative OSC-4) had a Pd concentration of 0.5 wt %. The Comparative OSC-4 material was then aged in 10% steam and 90% air at 1050° C. for 12 hours.

A composite OSC according to the present disclosure (Inventive OSC-5) was prepared as follows. Cerium nitrate (34 g) was dissolved in 300 ml of water and 0.92 g of palladium nitrate solution (27 wt % Pd) was added. The formed solution was then added to 40 g of Comparative OSC-1 described in EXAMPLE 1. Thereafter, sodium hydroxide was added to the combined solution to raise pH to approximately 9 and co-precipitate palladium and cerium onto the OSC-1 material. The co-precipitate on OSC-1 was filtered and washed with deionized water to provide a filter cake, which was dried at 100° C. and calcined at 550° C. for two hours. The resulting Inventive OSC-5 had the following composition: 35-37 wt % $ZrO_2$, 55-58 wt % $CeO_2$, approx. 4 wt % $La_2O_3$, approx. 4 wt % $Y_2O_3$, and 0.5 wt % Pd. The Inventive OSC-5 material was aged in 10% steam and 90% air at 1050° C. for 12 hours.

Example 5—TPR Testing of OSC Materials

Figure 4:
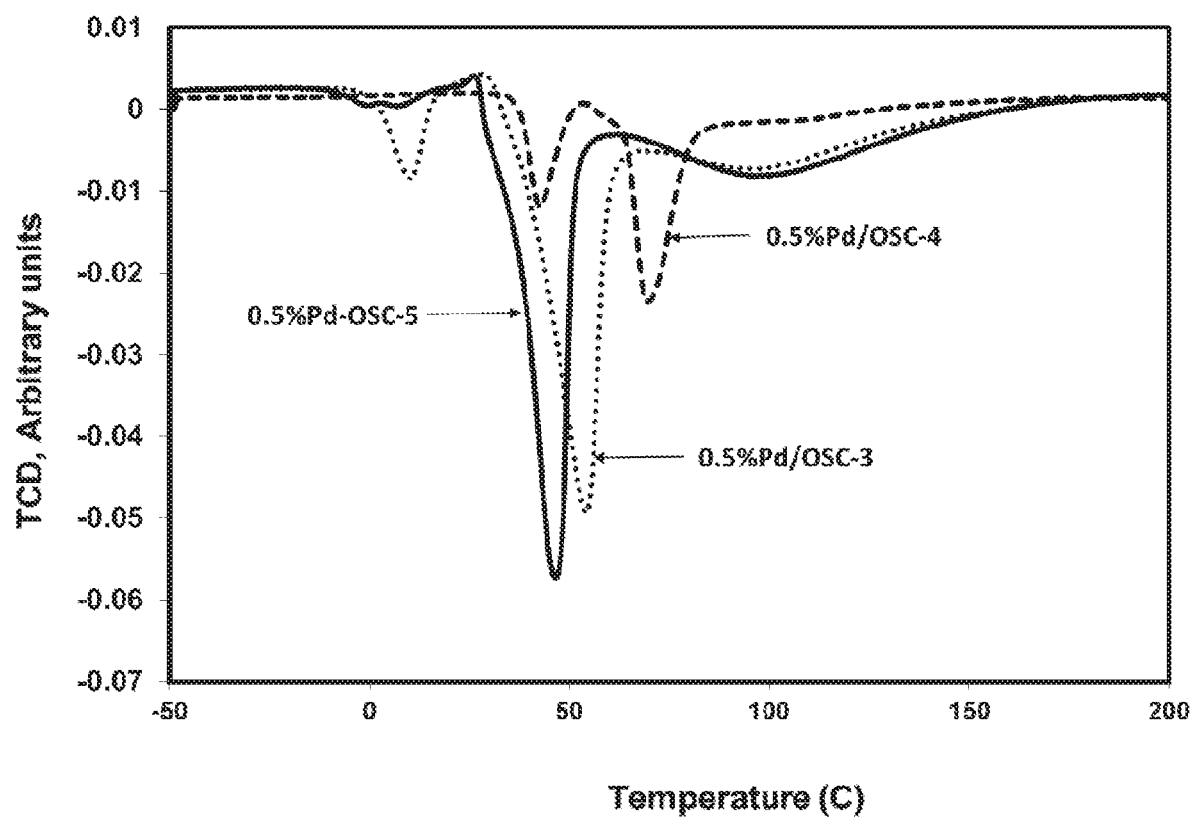
FIG. 4 is graph showing a TPR trace for two comparative OSC materials and an inventive OSC material according to an exemplary embodiment of the present disclosure.

The aged Comparative OSC-3, Comparative OSC-5, and Inventive OSC-5 materials were subjected to the Thermal Program Reduction test. To carry out the test, the catalysts were first completely oxidized. Thereafter, 50 mg of catalyst was introduced into a TPR cell where a flow of 1% hydrogen by weight in nitrogen was passed over the catalyst. Temperature was then ramped from room temperature up to 900° C. at a rate of 20° C./min. Results are shown in FIG. 4. The distribution of $H_2$ Consumption as a function of temperature is shown in FIG. 4. Total $H_2$ consumption is shown in TABLE 3.

TABLE 3

| | Sample | | |
|---|---|---|---|
| | 0.5% Pd-OSC-3 | 0.5% Pd-OSC-4 | 0.5% Pd-OSC-5 |
| $H_2$ Consumption (cc of $H_2$ per gram of catalyst) | 7.45 | 3.16 | 6.63 |

Example 6—XPS Testing of OSC Materials

The aged Comparative OSC-3, Comparative OSC-4, and Inventive OSC-5 materials were subjected to x-ray photoelectron spectroscopy (XPS) testing to evaluate the surface chemistry of the two materials. The XPS data summary for Comparative OSC-3 and Inventive OSC-5 is provided in TABLE 4. As seen therein, although the two materials each comprised 0.5 wt % Pd, the Inventive OSC-2 material exhibited a significantly higher Pd surface concentration ($[Pd^{+2}]+[Pd^{+4}]$), the Comparative OSC-1 material having a Pd surface concentration of 0.38, and the Inventive OSC-2 material having a Pd surface concentration of 0.78. Further, the Ce surface concentration in the Comparative OSC-1 material was only 4.1 compared to the Ce surface concentration in the Inventive OSC-2 sample of 7.1. The higher surface concentration of Pd and Ce in the inventive OSC-2 sample is believed to improve oxygen mobility as compared to the Comparative OSC-1 sample.

TABLE 4

| Element | Comparative OSC-3 | Inventive OSC-5 |
|---|---|---|
| Cerium ($Ce^{+4}$) | 6.8 | 11.3 |
| Lanthanum ($La_2O_3$) | 2.4 | 1.7 |
| Palladium ($Pd^{+4}$) | 0.49 | 0.59 |
| Yttrium ($Y_2O_3$) | 2.0 | 1.5 |
| Zirconium ($ZrO_2$) | 15.6 | 12.0 |

Example 7—Preparation of Comparative OSC

An OSC washcoat was prepared as a comparative (Comparative OSC-6). A first slurry was prepared by impregnating Pd on a first amount of a commercial gamma-alumina (alumina-A) according to the following steps. The alumina was combined with palladium nitrate solution (Pd concentration of 25.9% by weight), and the Pd was fixed onto the alumina by drying at 110° C. and calcination at 550° C. for 2 hours. The calcined palladium on alumina was added to water containing barium acetate along with half of the La and Zr nitrates to form a slurry. The pH of the slurry was adjusted to 4.5 using nitric acid (diluted 1:1 with water). The material was continuous milled using a horizontal Eiger mill to a particle size distribution at 90% between 12 and 14 μm.

A second slurry was prepared by mixing remaining La and Zr nitrate in deionized water and adjusting the pH to about 4-5. Alumina-B (without Pd) was added to the slurry and milled using a horizontal Eiger mill to a particle size distribution of 90% between 11 and 13 μm. The first slurry and the second slurry were combined, and the pH was adjusted to about 4-5 to form the washcoat. This washcoat was applied onto a cordierite substrate with the following dimensions: 3.66 in.×1.5 in., 600 cpsi, and 4 millimeter wall thickness. The applied washcoat was dried and then calcined at 550° C. for two hours. The final wash coat loading composition was as follows: Pd=0.052 g/in$^3$; Pd/Al$_2$O$_3$-A=1 g/in$^3$; Al$_2$O$_3$—B=1.8 g/in$^3$; La$_2$O$_3$ (as nitrate) 0.06 g/in$^3$; ZrO$_2$ (as nitrate)=0.03 g/in$^3$; and BaO (as BaOAc)=0.06 g/in$^3$. A core (1 in.×1.5 in.) was taken from the so-formed material and was aged in 10% steam 90% air at 1050° C. for 12 hours. The aged sample was evaluated on a lab reactor for light off.

Example 8—Preparation of Inventive OSC

Pd and Cerium nitrate solutions with corresponding Pd and CeO2 concentrations of 25.9 and 20% by weight were used. The coimpregnated Pd and CeO2 were fixed on the alumina surface by drying at 110° C. and calcination at 550° C. for 2 hours. A slurry was prepared by mixing distilled water with Barium nitrate, adding the Pd—Ce/Al$_2$O$_3$, and adding half of the La and Zr nitrates. The pH was adjusted to 4.5 using nitric acid (diluted 1:1 with water). The material was continuous milled using a horizontal Eiger mill for particle size distribution at 90% between 12 and 14 μm.

A second slurry was prepared by mixing the remaining La and Zr nitrate in deionized water and adjusting the pH to about 4-5. The alumina-B (without Pd) was added to the slurry and milled using a horizontal Eiger mill to particle size distribution at 90% between 11 and 13 μm. The first slurry and the second slurry were combined, and the pH was adjusted to about 4-5 to form the washcoat. This washcoat was applied onto a cordierite substrate with the following dimensions: 3.66 in.×1.5 in., 600 cpsi, and 4 millimeter wall thickness. The applied washcoat was dried and then calcined at 550° C. for two hours. The final wash coat loading composition was as follows: Pd=0.052 g/in$^3$; Pd—Ce/Al$_2$O$_3$-A=1 g/in$^3$; Al$_2$O$_3$—B=1.8 g/in$^3$; La$_2$O$_3$ (as nitrate) =0.06 g/in$^3$; ZrO$_2$ (as nitrate)=0.03 g/in$^3$; and BaO (as BaOAc)=0.06 g/in$^3$. A core (1 in.×1.5 in.) was taken from the so-formed material and was aged in 10% steam 90% air at 1050° C. for 12 hours. The aged sample was evaluated on a lab reactor for light off.

Example 9—Light Off Testing

Please describe testing conditions. The test results showing the percentage of residual hydrocarbon, CO, and NOx after lean/rich aging are shown in TABLE 5. As seen therein, the washcoat of inventive OSC-7 exhibited reduced residuals compared to the washcoat of Comparative OSC-6, thus indicating that the co-impregnation of Pd and CeO$_2$ improved performance significantly.

TABLE 5

| Residual | Comparative OSC-6 | Inventive OSC-7 |
|---|---|---|
| THC (wt %) | 6.3 | 6.1 |
| CO (wt %) | 19.9 | 18.4 |
| NOx (wt %) | 33.7 | 29.4 |

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A composite material comprising (i) a solid solution comprising a co-precipitate of at least one platinum group metal and at least one rare-earth metal oxide, and zirconia; and (ii) a support material supporting the solid solution,
   wherein the platinum group metal is palladium,
   wherein the rare-earth metal oxide comprises ceria,
   wherein the support material comprises an alumina, and
   wherein the solid solution is impregnated on the support material.

2. The composite material of claim 1, wherein the composite material further comprises one or more oxides of Lanthanum, Yttrium, Neodymium, Gadolinium, and Praseodymium.

3. The composite material of claim 1, wherein the composite material further comprises one or more oxides of Niobium, Iron, Nickel, Silver, Cobalt, Manganese, Copper, and Tungsten.

4. The composite material of claim 1, wherein the support material comprises an oxygen storage component.

5. The composite material of claim 1, wherein the composite material includes at least one further platinum group metal that is not part of the solid solution.

6. The composite material of claim 1, wherein the composite material includes at least one further rare-earth metal oxide that is not part of the solid solution.

7. A three-way catalyst composition comprising an oxygen storage component including the composite material according to claim 1.

8. A method of preparing a composite material according to claim 1, the method comprising combining a compound of a platinum group metal with a compound of a rare-earth metal and zirconia to form a liquid solution, co-precipitating the platinum group metal, rare-earth metal and zirconium nitrate from the liquid solution to form a solid solution of the platinum group metal, the rare-earth metal, and co-precipitating or impregnating the solid solution on a support material,
   wherein the platinum group metal is palladium,
   wherein the rare-earth metal oxide comprises ceria, and
   wherein the support material comprises an alumina.

9. The method of claim 8, wherein the co-precipitating comprises adding an alkalinizing material in an amount sufficient to raise the pH of the liquid solution to about 8 or greater.

10. The method of claim 8, comprising washing and filtering the solid solution of the platinum group metal, the rare-earth metal and zirconium nitrate to form a filter cake.

11. The method of claim 10, comprising calcining the filter cake at a temperature of about 300° C. or greater for a time of about 10 minutes or greater.

* * * * *